United States Patent
Danilak et al.

(10) Patent No.: US 10,380,014 B2
(45) Date of Patent: *Aug. 13, 2019

(54) ADDRESS TRANSLATION FOR A NON-VOLATILE MEMORY STORAGE DEVICE

(71) Applicant: Western Digital Technologies, Inc., San Jose, CA (US)

(72) Inventors: Radoslav Danilak, Cupertino, CA (US); Amit Bothra, San Jose, CA (US); Arvind Pruthi, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/489,632

(22) Filed: Apr. 17, 2017

(65) Prior Publication Data

US 2017/0351605 A1 Dec. 7, 2017

Related U.S. Application Data

(63) Continuation of application No. 14/460,216, filed on Aug. 14, 2014, now Pat. No. 9,626,288.

(Continued)

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ........... G06F 3/06; G06F 3/0655–0667; G06F 3/0671–068; G06F 3/0683–0689;

(Continued)

(56) References Cited

U.S. PATENT DOCUMENTS 6,535,949 B1  3/2003  Parker
8,261,010 B2  9/2012  Eom et al.
(Continued)

FOREIGN PATENT DOCUMENTS

TW   200732918 A   9/2007

OTHER PUBLICATIONS

Achieving page-mapping FTL performance at block-mapping FTL cost by hiding address translation; Hu et al.; 2010 IEEE 26th Symposium on Mass Storage Systems and Technologies; May 3-7, 2010 (Year: 2010).*

(Continued)

*Primary Examiner* — Daniel C. Chappell
(74) *Attorney, Agent, or Firm* — Morgan, Lewis & Bockius LLP

(57) ABSTRACT

Techniques are described for accessing data from a storage device. In one example, the storage device may include a storage medium comprising non-volatile memory, a network connection, and one or more processing entities. The one or more processors may be configured to receive a request from the network connection at the non-volatile memory storage device for accessing data associated with a file system object, the request comprising a virtual address offset, a file object identifier and a size of the data access, perform, at a flash translation layer of a storage device software stack executing on the one or more processing entities of the storage device, a translation from the virtual address offset to a physical address for the data stored on the non-volatile memory, using the virtual address offset and the file object identifier, and access the data from the physical address from the storage medium.

20 Claims, 4 Drawing Sheets

Related U.S. Application Data

(60) Provisional application No. 61/865,889, filed on Aug. 14, 2013.

(58) Field of Classification Search
CPC ..... G06F 2212/00; G06F 2212/10–178; G06F 2212/20–7211; G06F 2212/9201; G11C 16/00–3495
See application file for complete search history.

(56) References Cited

U.S. PATENT DOCUMENTS

| | | | |
|---|---|---|---|
| 8,327,066 B2 | 12/2012 | Heo et al. | |
| 8,625,344 B2 | 1/2014 | Lee et al. | |
| 8,694,754 B2 | 4/2014 | Schuette et al. | |
| 8,812,773 B2 | 8/2014 | Kim et al. | |
| 8,838,936 B1 | 9/2014 | Salessi et al. | |
| 8,984,207 B2 | 3/2015 | Han et al. | |
| 9,135,181 B2 | 9/2015 | Eleftheriou et al. | |
| 2007/0143532 A1 | 6/2007 | Gorobets et al. | |
| 2008/0282025 A1 | 11/2008 | Biswas et al. | |
| 2008/0307155 A1 | 12/2008 | Sinclair | |
| 2009/0070547 A1 | 3/2009 | Jeong et al. | |
| 2010/0017650 A1 | 1/2010 | Chin et al. | |
| 2011/0040930 A1 | 2/2011 | Shin et al. | |
| 2011/0060869 A1 | 3/2011 | Schuette | |
| 2012/0239871 A1 | 9/2012 | Badam et al. | |
| 2013/0166828 A1 | 6/2013 | Chun | |
| 2013/0166855 A1 | 6/2013 | Batwara et al. | |
| 2014/0059279 A1 | 2/2014 | He et al. | |
| 2014/0122774 A1 | 5/2014 | Xian et al. | |
| 2014/0181383 A1 | 6/2014 | Eleftheriou et al. | |
| 2014/0215129 A1 | 7/2014 | Kuzmin et al. | |

OTHER PUBLICATIONS

Ma et al., "A survey of address translation technologies for flash memories," ACM Computing Surveys, vol. 46, Iss 3, Article 36, Jan. 2014 (39 pages).

Park et al., "Design and analysis of flash translation layers for multi-channel NAND flash-based storage devices," IEEE Transactions on Consumer Electronics, vol. 55, Iss 3, Aug. 2009, pp. 1392-1400.

Definition of a network; Merriam Webster Online Dictionary, retrieved on Dec. 9, 2015 from http://www.meriam-webster.com/dictionary/network, 1 page.

Extended European Search Report from European Application No. 14836121.5, dated Mar. 3, 2017.

European Office Action from European Patent Application No. 14836121.5, dated Mar. 14, 2019, 6 pages.

* cited by examiner

ADDRESS TRANSLATION FOR A NON-VOLATILE MEMORY STORAGE DEVICE

CROSS-REFERENCE TO RELATED APPLICATIONS

The present application claims the benefit of priority under 35 U.S.C. § 120 as a continuation of U.S. patent application Ser. No. 14/460,216, entitled "Address Translation for a Non-Volatile Memory Storage Device," filed Aug. 14, 2014, now issued as U.S. Pat. No. 9,626,288, which claims benefit under 35 U.S.C. § 119(e) of U.S. Provisional Patent Application Ser. No. 61/865,889, filed Aug. 14, 2013, entitled "Vertically Integrated Storage," which are incorporated by reference herein in their entirety for all purposes.

BACKGROUND

Aspects of the disclosure relate to computing and communication technologies. In particular, aspects of the disclosure relate to systems, methods, apparatuses, and computer-readable media for improving performance of storage devices.

Storage devices for enterprise systems require massive storage capacity. Additionally, storage solutions for enterprise systems require sophisticated storage techniques for reliability, robustness, fault tolerance, maximizing storage capacity, minimizing power consumption, and reducing latency. Various storage industry players have specialized in aspects of these storage techniques in a segmented manner providing piecemeal solutions. Combining of these various segmented solutions results into a clunky storage solution that is less than the sum of its parts and significantly underperforms across the board. The segmentation and underperformance of the available solutions today results in a significant deterrent in adaptation of newer storage technologies, such as solid state devices.

BRIEF SUMMARY

Various systems, methods, apparatuses, and computer-readable media for accessing a storage medium are described. Techniques are described for vertically integrating the various functions for optimally accessing a solid-state memory based, storage hardware.

An example non-volatile memory storage device may include a storage medium comprising non-volatile memory, a network connection for receiving data read and write requests to the storage medium and one or more processing entities. The one or more processing entities may be configured to receive a request from the network connection at the non-volatile memory storage device for accessing data associated with a file system object, the request comprising a virtual address offset, a file object identifier and a size of the data access, perform, at a flash translation layer of a storage device software stack executing on the one or more processing entities of the storage device, a translation from the virtual address offset to a physical address for the data stored on the non-volatile memory, using the virtual address offset and the file object identifier, and access the data from the physical address from the storage medium.

In certain embodiments, the file system object may be provided a virtual block space for accessing data from the non-volatile memory storage device that is independent of virtual block spaces assigned to other file system objects, wherein each virtual block space provides the file system object an exclusive view of the address space. For example, the file system object with an exclusive view of the address space may assume that the file system object is the only object using the address space and write to any address in the virtual block space. The mapping in the virtual block space is translated to the physical block space to appropriately consider the mappings for all the other virtual block spaces associated with the other file system objects. Examples of file system objects may include files, folders, directories, etc.

In certain embodiments, the data associated with the file system object is accessed for performing a modify operation followed by performing a write operation to the virtual address offset associated with the file system object. In some instances, the data associated with the file system object may be modified by the file translation layer by writing to a log structured file, wherein the modify operation for the data or a portion of the data is performed by using a log structured write only once between receiving the request for modifying the data or the portion of the data from the network and completing the write operation to the non-volatile memory.

In certain embodiments, the translation from the virtual address offset to the physical address on the non-volatile memory by the flash translation layer may be at least partially based on the global wear leveling performed by the flash translation layer, wherein the global wear leveling changes the virtual address offset to the physical address translation to reduce the wear caused by repeated data accesses to the same physical location on the non-volatile memory.

In some implementations, the flash translation layer further performs block allocation for storing and accessing data from the non-volatile memory. In some implementations, the garbage collection for using a log structured file system is performed only in the flash translation layer and in some implementations, the flash translation layer performs reads and writes to the non-volatile memory using a log-structured file system.

In certain aspects, the virtual address offset is provided by the access request from the network connection using a network file sharing protocol. In certain aspects disclosed herein, the virtual address offset is provided by the access request from if provided by a layer higher than a file system layer of the storage device software stack. In one implementation, only a single address translation is performed in the storage device software stack executing on the one or more processors of the non-volatile memory storage device between receiving the request for accessing the data at a file system layer of the software stack and accessing the data at the non-volatile memory.

Aspects described above or herein with respect to a non-volatile storage device may be performed as a method, without limitations using various components or equivalent components or means for performing steps describes herein. Furthermore, aspects described herein may be performed using instructions stored on a non-transitory computer readable storage medium and executable by one or more processors. Moreover, an apparatus with means described herein or equivalent means may be used for performing the steps described herein without deviating from the scope of the invention.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
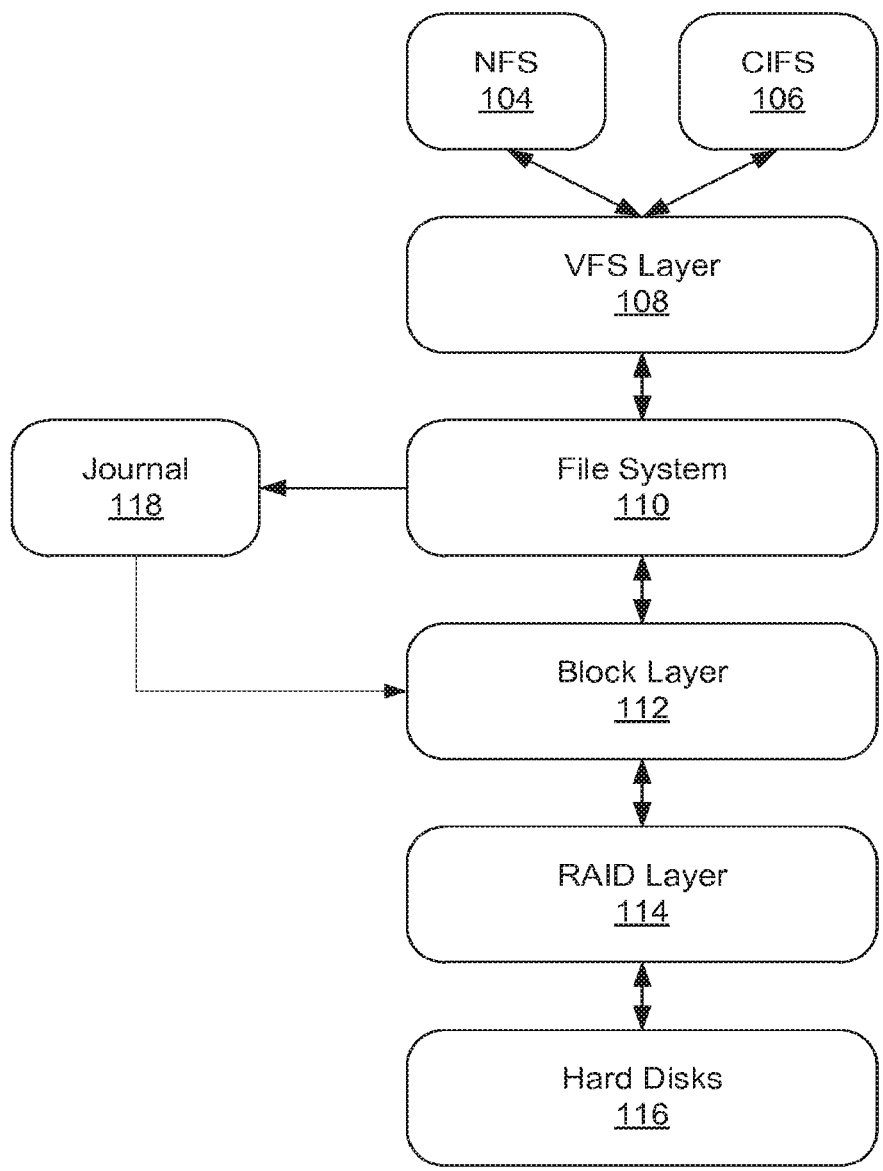
FIG. 1 illustrates a simplified diagram of a layered approach for accessing storage hardware.

FIG. 1 illustrates a simplified diagram of a layered approach for accessing storage hardware. The layered approach for storage devices uses a number of stacked software/firmware layers for accessing the storage hardware from the application layer 116. As shown in FIG. 1, in one implementation, the layered approach includes the storage device and the firmware associated with the storage device 116, Redundant Array of Independent Disks (RAID) layer 114, block layer 112, file system 110, virtual file system (VFS) layer 108 and the higher level file sharing systems such as network file system (NFS) 104 and common internet file system (CIFS) 106. Traditionally, the various layers in the stack may be developed by various storage device industry vendors.

Typically, the various layers associated with the processing of an I/O request to the storage device traverses multiple layers of a file system stack before making its way to the storage hardware. For example, an I/O request may arrive through a network file sharing protocol such as NFS 104 or CIFS 106 or any other suitable file sharing protocol. NFS 104 and CIFS 106 are example of file sharing file systems that enable accessing files over a network. NFS 104 file systems may be used in Unix/Linux environment, whereas CIFS 106 may be oriented towards networks with windows-based application servers or clients. NFS 104 and CIFS 106 may interact with the system through the VFS layer 108. The VFS layer 108 provides a standardized interface for higher layer file systems for accessing the lower layers. For example, the VFS layer 108 may conform to a particular standard, such as POSIX, for providing a standardized interface to the higher layers.

The file system layer 110 provides abstraction for storing, retrieving and updating files on the storage device. Additionally, the file system manages access to data and metadata of the files and available space on the device. Typically, the file system layer 110 provides a layer of mapping between the VFS layer 108 and the block layer 112. For example, the file system layer 110 may receive an triode and block offset from the higher layers and map it to a logical unit number (LUN) and virtual block number (VBN).

The file system may also provide journaling functionality 118. Journaling may refer to logging state before committing the state in state machine. In the event of a catastrophic event, such as a system crash or a power failure, journaling may enable the system to recover faster and avoid corruption of system state.

The file system layer 110 may also perform block allocation schemes by finding free blocks for performing the write operations using the block layer 112. The block layer 112 provides an interface to write to the underlying layer in blocks. The RAID layer 114 provides fault tolerance by spreading the data and parity information across multiple disks or planes. The RAID layer 114 typically provides a layer of translation using mapping tables. For example, the RAID layer 114 may take the LUN and VBN addresses from the file system layer 110 and map those address to the device logical block address (LBA).

In addition to the layers discussed above, the physical hardware for storage may also implement its own firmware for storing and managing access to the physical medium. For example, in some embodiments, the firmware interacting with the hardware may also act as another layer implementing its own management, caching, journaling, mapping, and write/garbage collection. For instance, the firmware layer may map the LBA to cylinder, track and offset for a magnetic hard disk drive using a preset mathematical formula. However, as discussed in more detail below, the mapping from LBA to the physical medium becomes more involved for a solid state device, since the write sectors are moved around the physical medium to accommodate for wear leveling and more sophisticated garbage collection.

In addition to their primary roles discussed above, most of the layers of the storage stack also perform additional house-keeping routines, such as maintaining memory, management functions, caching, linear to physical address mapping, garbage collection and journaling of states for protection against catastrophic events. Garbage collection may refer to the releasing of memory/storage resources no longer needed by the layer. Many of these house-keeping routines are duplicated in each layer of the storage stack, since these house-keeping routines performed by each layer are dedicated to that specific layer and isolated from the other layers because of the layered architecture causing significant memory, processing and performance overhead.

Furthermore, for an I/O request to reach the storage device 116, the I/O request must pass through several layers and perform several address translations, as shown in FIG. 1. The passing of the data message through multiple layers requires a number of encapsulation and de-encapsulation steps that also generates significant overhead.

Many layers, such as the VFS layer 108 and the RAID layer 116 also manages their own mapping structures and algorithms to translate the I/O request from one layer to another. Mapping operations are expensive operations, increasing latency of data operations and degrading the performance of the system even further. Furthermore, continuous mapping operations require multiple accesses and writes to the device. In non-volatile memory devices, such writes to the medium cause wear on the device decreasing the life of the non-volatile memory.

Moreover, in some cases the storage stack layers may be developed by different vendors and adhere to various standard bodies. Every layer is developed in isolation from the other layers in the storage stack software vastly repeating the same functionality in different manifestations; thus, significantly increasing the overhead as well as the probability of bugs in the system. Additionally, the storage stack layered approach hampers innovation in the product line, since any innovation that disturbs the interfaces between the different layers goes through a complex negotiation process with the various stake holders, such as the vendors for the different layers in the software stack. Furthermore, the performance degradation has a multiplicative effect in the layered architecture further exasperating performance issues.

In some embodiments of the invention, solid state devices, such as flash based non-volatile memory devices may be used. Examples of non-volatile memory may be implemented using NOR or NAND technology to map data. NOR flash provides high-speed random access, reading and writing data in specific memory locations; it can retrieve as little as a single byte. NAND flash can read randomly but typically is written sequentially at high speed, handling data in small blocks called pages. NAND flash reads faster than it writes, quickly transferring whole pages of data. NOR flash behaves the same way except that reads are faster than NAND flash and writes are slower. Less expensive than NOR flash at high densities, NAND technology may offer higher capacity for the same-size silicon.

Some of the duplication of functionality, latency issues due to redundant mapping functions and garbage collection in multiple layers may be even more problematic in storage devices that use solid state devices. For example, unnecessary writes due to duplicated mapping, journaling, storing of metadata and garbage collection functions occurring at different layers may cause unnecessary wear on the solid state devices such as NAND flash that are sensitive to excessive writes.

Figure 2:
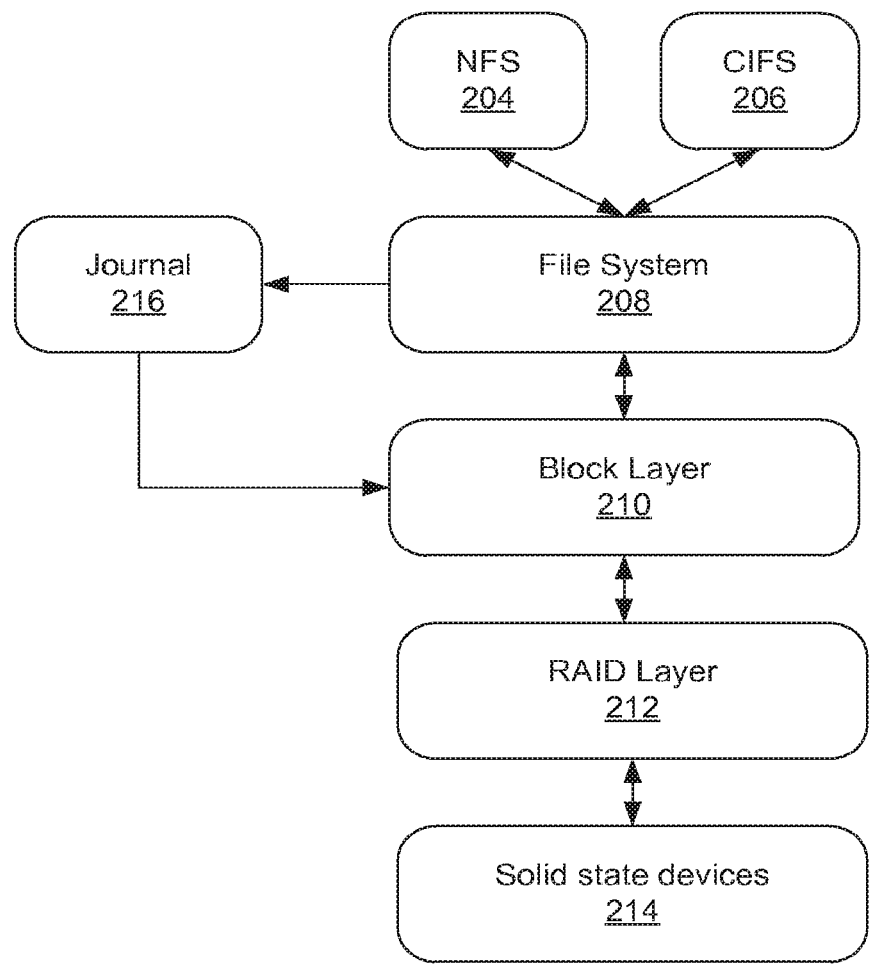
FIG. 2 illustrates a simplified diagram of an enterprise, log-structured file system for accessing solid-state memory based storage hardware.

FIG. 2 illustrates a simplified diagram of a log-structured file system for accessing solid state memory based storage hardware. A log-structured file system is a file system in which data and metadata are written sequentially to a circular buffer, called a log. Conventional file systems tend to lay out files for spatial locality and make in-place changes to their data structures in order to perform well on optical and magnetic disks, which tend to seek relatively slowly. However, for solid-state devices log-structured file system may be preferable in some embodiments, since solid state devices have relatively faster seek times.

In FIG. 2, the file system 208 is a log-structured file system. The log-structured file systems may have several advantages over conventional file systems. For example, write throughput is improved since writes can be batched into large sequential runs and costly seeks are kept to a minimum. Furthermore, writes create multiple, chronologically-advancing versions of both file data and meta-data. Some implementations make these old file versions nameable and accessible, a feature sometimes called snapshotting. Also, recovery from crashes is simpler. Upon its next mount, the file system does not need to walk all its data structures to fix any inconsistencies, but can reconstruct its state from the last consistent point in the log.

Log-structured file systems, however, must perform sophisticated garbage collection by reclaiming free space from the tail of the log to prevent the file system from becoming full when the head of the log wraps around to meet it.

Similar to the conventional file system stack described in FIG. 1, the log-structured file system of FIG. 2 may also provide an interface for NFS 204 and CIFS 106. The file system stack may also have a block layer 210, RAID 212, and Journal 216 similar to the file system stack from FIG. 1 in at least some aspects of its functionality.

In addition to the layers discussed above, the solid state devices may also implement its own firmware for storing and managing access to the physical drive. For example, in some embodiments, the firmware interacting with the hardware may also act as another layer implementing its own management, caching, journaling, mapping, and write/garbage collection.

As shown in FIG. 2, in one implementation, solid-state devices may be used for storage. Typically, the flash translation layer implemented in the firmware at the hardware layer also employs log-structured algorithms for reading and writing to the physical medium.

The duplication of using log-structured algorithms at multiple layers (i.e., file system 208 and device layer 214) results in efficiencies. For example, garbage collection must be performed at least at two layers for servicing of an I/O request to the storage device. In some embodiments, garbage collection for log-structured files systems may be resource intensive and may lead to considerable inefficiencies in the system.

Furthermore, in the system described in FIG. 2, mapping and translation may be performed at multiple layers. First the mapping may be performed at the files system layer 208, from Inode and block offset to LUN and VBN. Then at the RAID layer 212 from LUN and VBN to device LBA. Finally, the mapping may be performed again at the firmware layer at the solid state devices from LBA to PBA (Physical Block Address). Multiple mappings at various layers leads to significant inefficiencies, especially while using solid state devices as the storage medium.

Figure 3:
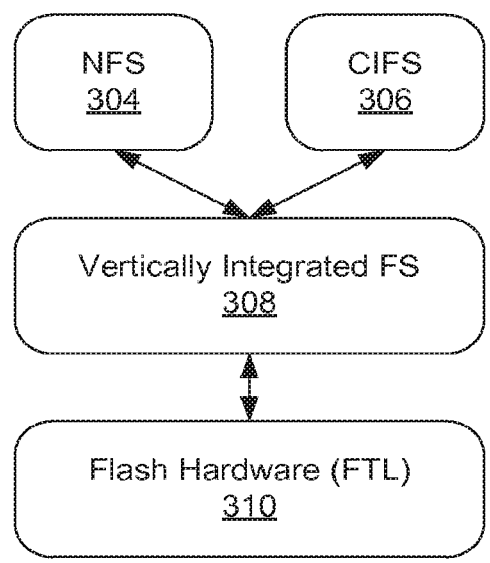
FIG. 3 illustrates a simplified diagram of an integrated file system software stack for accessing solid state storage according to an embodiment of the invention.

FIG. 3 illustrates a simplified diagram of an integrated file system software stack for accessing storage medium according to certain embodiments of the invention. FIG. 3 improves upon many of the deficiencies described with respect to FIG. 1 and FIG. 2 by integrating functionality from several layers, enhancing current techniques and removing duplication or unneeded functionality. In FIG. 3, the I/O request may also arrive through a network file sharing protocol such as NFS 304 or CIFS 306 or any other suitable file sharing protocol.

According to certain embodiments of the invention, the storage medium may be implemented using non-volatile memory. Example implementations of non-volatile memory based devices may include, but are not limited to, using NOR, NAND, MRAM (Magnetoresistive RAM), FRAM (Ferroelectric RAM, RRAM (Resistive RAM)), phase change memory or any other suitable technology. NOR flash may provide high-speed random access and reading and writing data in specific memory locations such as up to a single byte. NAND flash may read randomly but typically is written sequentially at high speed, handling data in small blocks called pages. NAND flash may read faster than it writes, quickly transferring whole pages of data. NOR flash may behave in the same way except that reads may be faster than NAND flash and writes may be slower. Generally, less expensive than NOR flash at high densities, NAND technology may offer higher capacity for the same-size silicon.

In some implementations, embodiments of the invention may utilize a single-level cell (SLC) NAND flash technology. In other implementations, embodiments of the invention may utilize a Multi-Level Cell (MLC) NAND flash storage medium. MLC NAND is a flash memory technology using multiple levels per cell to allow more bits to be stored using the same number of transistors. In SLC NAND flash technology, each cell can exist in one of two states, storing one bit of information per cell. Most MLC NAND flash memory technologies have four possible states per cell, so it can store two bits of information per cell. Using MLC NAND may be advantageous for reducing the cost of per unit of storage due to the higher data density.

In certain embodiments of the invention, the system hardware, such as the non-volatile memory is integrated with the vertically integrated system, therefore integrating the hardware and software solutions. In contrast to prior art systems, in certain embodiments of the invention, the non-volatile memory is not implemented as part of several discrete black-box devices purchased off the shelf or from original equipment manufacturers (OEMs). Instead, certain embodiments of the invention describe developing a storage system from ground up where the storage hardware is implemented as a single integrated system comprising non-volatile memory that is managed by a single software stack, comprising all the house-keeping functionality. In such a system only one instance of the house keeping functions, such as management, journaling, garbage collection, mapping, and system write combining/caching may be needed for managing all of the non-volatile memory in the storage device. In certain implementations, the a single instance of the flash translation layer manages all the non-volatile memory for the storage device and performs some or all of the above house-keeping functions.

Embodiments of the invention propose implementing a unified and integrated file system, such as the vertically integrated file system 308, shown in FIG. 3. In certain implementations, the vertically integrated file system 308 provides a standardized interface, such as a POSIX compliant interface for interacting with network file sharing protocols such as NFS 304 and CIFS 306. In certain embodiments, only a single translation from a virtual address offset to physical address may be performed for processing the I/O request to the storage medium. In one implementation, the virtual address offset may be provided by the data access request.

In one implementation, storage hardware may be implemented using non-volatile memory as flash hardware 310. The translation mapping and block allocation may be performed in the flash translation layer (FTL) for the non-volatile memory. FTL is firmware that obfuscates the details of the underlying layout and structure of the flash hardware 310 to the upper layers. FTL may perform translations to move about data for wear leveling. In some implementations, FTL may use log-structured accesses to the physical flash hardware 310. The log-structured access may be performed only once for each access request. Since, multiple layers of mapping are detrimental to the performance and may also wear down the non-volatile memory, embodiments of the invention may enhance the mapping implementation of the FTL to provide a singular translation for the I/O request to the underlying storage. Therefore, in some implementations no mapping of virtual address offset to logical addresses may be needed in the file system 308 itself.

The I/O request may be converted to a file system object that may be used to access a file or folder on a storage device. According to one implementation, the FTL may provide each file system object with its own virtual block space. In other words, the FTL may provide each file system object with a map of the storage locations that the file system object can store and access data from. In one implementation, the file system object provides the file object identifier, virtual address offset of the data in the virtual block space and the number of bytes to the FTL for providing read or write access to the non-volatile memory. The FTL may perform global wear leveling before mapping the accesses to the physical underlying non-volatile memory. The FTL may also perform sparse virtual block number to physical block address translation by only providing a VBN to PBA mapping of blocks of data that have been accessed.

The FTL may translate the virtual address offset for the data access request using the virtual block space associated with the file object identifier and the virtual address offset to the physical address. In some instances, the translations between the virtual address offsets and the physical address may be periodically updated for wear leveling.

Embodiments of the invention may be advantageous in increasing overall efficiency of the system for non-volatile memory storage devices. In some implementation, duplication of functionality across multiple layers may be collapsed into one or more layers. Certain functionality, such as Journaling may be removed in certain implementations. In certain embodiments, core functions, such as mapping, garbage collection, block allocation and global wear leveling may all be performed by an enhanced FTL implementation.

Embodiments of the invention may be advantageous in increasing the efficiency of the overall file system stack by providing a single mapping translation for virtual to physical translations. Furthermore, the write path may also incur low latency due to no block allocation or journaling overhead. Embodiments of the invention also decrease wear on the flash by low metadata overhead.

It should be appreciated that the steps described above are for storing data on the storage medium. However, accessing data from the storage medium also may traverse through the same or similar steps in reverse order and performs reverse functionality in some instances.

It should be appreciated that the specific steps illustrated in FIG. 3 provide a particular mode of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 3 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 300.

Figure 4:
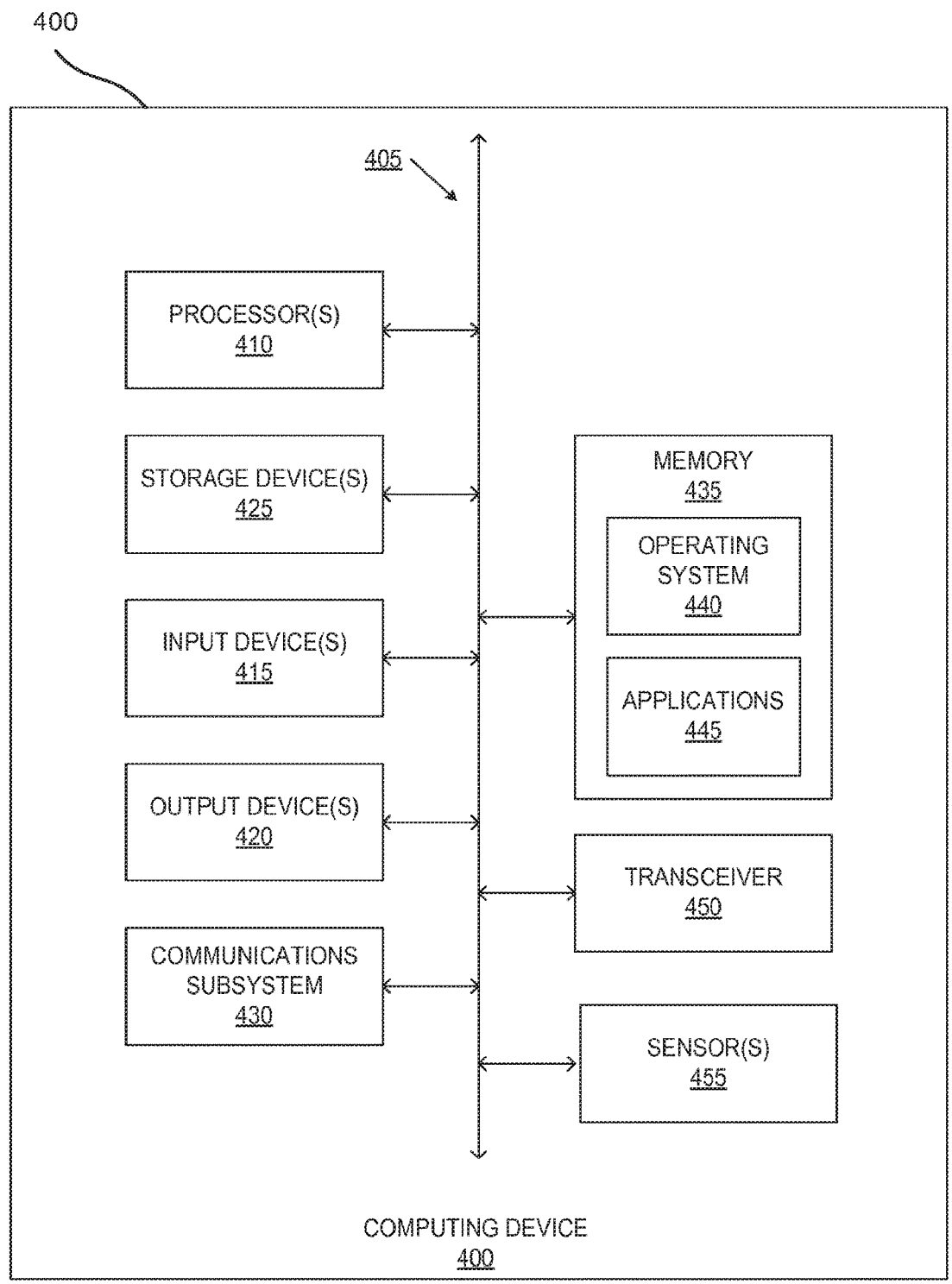
FIG. 4 illustrates an example of a computing system in which one or more embodiments may be implemented.

Having described multiple aspects of the vertically integrated architecture, an example of a computing system in which various aspects of the disclosure may be implemented may now be described with respect to FIG. 4. According to one or more aspects, a computer system as illustrated in FIG. 4 may be incorporated as part of a computing device, which may implement, perform, and/or execute any and/or all of the features, methods, and/or method steps described herein. For example, computer system 400 may represent some of the components of a device and/or access point apparatus. A device may be any computing device with a wireless unit, such as an RF receiver. In one embodiment, the system 400 is configured to implement any of the methods described herein. FIG. 4 provides a schematic illustration of one embodiment of a computer system 400 that can perform the methods provided by various other embodiments. FIG. 4 is meant only to provide a generalized illustration of various components, any and/or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a camera, a mouse, a keyboard and/or the like; and one or more output devices 420, which can include without limitation a display unit, a printer and/or the like. The computing device 400 may also include a sensor(s), such as temperature sensors, power sensors, etc. for monitoring health of the system.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. In some embodiments, the storage may be implemented using non-volatile memory. Such storage devices may be configured to implement any appropriate data storage, including without limitation, various file systems, database structures, and/or the like.

The computer system 400 might also include a communications subsystem 430, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 430 may permit data to be exchanged with a network (such as the network described below, to name one example), other computer systems, and/or any other devices described herein. In many embodiments, the computer system 400 may further comprise a non-transitory working memory 435, which can include a RAM or ROM device, as described above. The computer system 400 might also include a transceiver 1050 for facilitating communication by the communications subsystem 430 with the external entities.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 400, various computer-readable media might be involved in providing instructions/code to processor(s) 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire and fiber optics, including the wires that comprise the bus 405, as well as the various components of the communications subsystem 430 (and/or the media by which the communications subsystem 430 provides communication with other devices). Hence, transmission media can also take the form of waves (including without limitation radio, acoustic and/or light waves, such as those generated during radio-wave and infrared data communications).

Some embodiments may employ a computer system (such as the processor 410) to perform methods in accordance with the disclosure. For example, some or all of the procedures of the described methods may be performed by the viewing apparatus in response to the processor executing one or more sequences of one or more instructions (which might be incorporated into an operating system and/or other code, such as an application program) contained in working memory. Such instructions may be read into the working memory from another computer-readable medium, such as one or more of the storage device(s). Merely by way of example, execution of the sequences of instructions contained in the working memory might cause the processor(s) to perform one or more procedures of the methods described herein.

Again, embodiments employing computer systems described herein are not limited to being physically connected to the viewing apparatus. Processing may occur in another apparatus, connected via wire or wirelessly to the viewing apparatus. For example, a processor in a phone or instructions for executing commands by a phone or tablet may be included in these descriptions. Similarly, a network in a remote location may house a processor and send data to the viewing apparatus.

The terms "machine-readable medium" and "computer-readable medium," as used herein, refer to any medium that participates in providing data that causes a machine to operate in a specific fashion. In an embodiment implemented using the processor 410, various computer-readable media might be involved in providing instructions/code to processor(s) 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as flash memory or DDR3 RAM. Transmission media include, without limitation, coaxial cables, copper wire and fiber optics, as well as the various components of a communications subsystem (and/or the media by which the communications subsystem provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:
1. A non-volatile memory storage device comprising:
a storage medium comprising a non-volatile memory;
a network connection for receiving data read and write requests to the storage medium;
a processing entity comprising a flash translation layer, the flash translation layer configured to:
receive an access request from the network connection at the non-volatile memory storage device for accessing data associated with a file system object, the access request comprising a virtual address offset, a file object identifier and a size of data of the access request;
perform, at the flash translation layer of a storage device software stack executing on the processing entity of the non-volatile memory storage device, a translation from the virtual address offset to a physical address of the data of the access request stored on the non-volatile memory using the virtual address offset and the file object identifier; and
access the data from the physical address from the storage medium, wherein the data of the access request associated with the file system object is modified by the flash translation layer by writing to a log-structured file of a log-structured file system of the non-volatile memory, and the translation from the virtual address offset to the physical address for the data of the access request stored on the non- volatile memory is based at least in part on global wear leveling performed by the flash translation layer.

2. The non-volatile memory storage device of claim 1, wherein the file system object is provided a virtual block space for accessing data from the non-volatile memory storage device that is independent of virtual block spaces assigned to other file system objects, wherein each virtual block space provides the file system object an exclusive view of an address space.

3. The non-volatile memory storage device of claim 1, wherein the data associated with the file system object is accessed for performing a modify operation followed by performing a write operation to the virtual address offset associated with the file system object.

4. The non-volatile memory storage device of claim 3, wherein the modify operation for the data or a portion of the data is performed by the flash translation layer by using a log structured write only once between receiving the access request for modifying the data or the portion of the data from the network connection for modifying the data or the portion of the data received from the network connection and completing the write operation to the physical address of the non-volatile memory.

5. The non-volatile memory storage device of claim 1, wherein the global wear leveling changes the virtual address offset to a different physical address than the physical address generated by the flash translation layer as a result of the translation from the virtual address offset to the physical address of the data stored on the non-volatile memory to reduce wear caused by repeated data accesses to a same physical location on the non-volatile memory.

6. The non-volatile memory storage device of claim 1, wherein the flash translation layer further performs block allocation for storing and accessing data from the non-volatile memory.

7. The non-volatile memory storage device of claim 1, wherein garbage collection for using a log structured file system is performed only in the flash translation layer.

8. The non-volatile memory storage device of claim 1, wherein the flash translation layer performs reads and writes to the non-volatile memory using the log-structured file system.

9. The non-volatile memory storage device of claim 1, wherein the virtual address offset is provided by the access request from the network connection using a network file sharing protocol.

10. The non-volatile memory storage device of claim 1, wherein the virtual address offset is provided by the access request from if provided by a layer higher than a file system layer of the storage device software stack.

11. The non-volatile memory storage device of claim 1, wherein only a single address translation is performed in the storage device software stack executing on the processing entity of the non-volatile memory storage device between receiving the access request for the data at the flash translation layer of the storage device software stack and accessing the data of the access request at the non-volatile memory.

12. A system, comprising:
means for receiving an access request from a network connection at a non-volatile memory storage device for accessing data associated with a file system object, the access request comprising a virtual address offset, a file object identifier and a size of data of the access request;
means for performing, at a flash translation layer of a storage device software stack, a translation from the virtual address offset to a physical address of the data of the access request stored on a non-volatile memory using the virtual address offset and the file object identifier; and
means for accessing the data from the physical address of the data of the access request stored on the non-volatile memory, wherein the data of the access request associated with the file system object is modified by the flash translation layer by writing to a log-structured file of a log-structured file system of the non-volatile memory, and the translation from the virtual address offset to the physical address for the data of the access request stored on the non-volatile memory is based at least in part on global wear leveling performed by the flash translation layer.

13. The system of claim 12, wherein the file system object is provided a virtual block space for accessing data from the non-volatile memory storage device that is independent of virtual block spaces assigned to other file system objects.

14. The system of claim 12, wherein the global wear leveling changes the virtual address offset to a different physical address than the physical address generated by the flash translation layer as a result of the translation from the virtual address offset to the physical address of the data stored on the non-volatile memory to reduce wear caused by repeated data accesses to a same physical location on the non-volatile memory.

15. The system of claim 12, wherein the flash translation layer receives the virtual address offset for the access request through the network connection using a network file sharing protocol.

16. The system of claim 12, wherein only a single address translation is performed in the storage device software stack executing on the non-volatile memory storage device between receiving the access request for accessing the data at the flash translation layer of the storage device software stack and accessing the non-volatile memory.

17. A method, comprising:
receiving, from a network connection, an access request, at a flash translation layer of a software stack executing on a non-volatile memory storage device for accessing data associated with a file system object, the access request comprising a virtual address offset, a file object identifier and a size of data of the access request, wherein the flash translation layer manages a non-volatile memory;
performing, by the flash translation layer, a translation from the virtual address offset to a physical address for the data of the access request stored on the non-volatile memory using the virtual address offset and the file object identifier; and
accessing the data of the access request stored on the non-volatile memory, wherein the data of the access request associated with the file system object is modified by the flash translation layer by writing to a log-structured file of a log-structured file system of the non-volatile memory, and the translation from the virtual address offset to the physical address for the data of the access request stored on the non-volatile memory is based at least in part on global wear leveling performed by the flash translation layer.

18. The method of claim 17, wherein the global wear leveling changes the virtual address offset to a different physical address than the physical address generated by the flash translation layer as a result of the translation from the virtual address offset to the physical address of the data stored on the non-volatile memory to reduce wear caused by repeated data accesses to a same physical location on the non-volatile memory.

19. The method of claim 17, wherein the flash translation layer receives the virtual address offset for the data of the access request from a network via the network connection using a network file sharing protocol.

20. A non-transitory computer readable storage medium, the non-transitory computer readable storage medium comprising instructions, which when executed by a processor, cause the processor to:
receive an access request from a network connection at a non-volatile memory storage device for accessing data associated with a file system object, the access request comprising a virtual address offset, a file object identifier and a size of data of the access request;
perform, at a flash translation layer of a storage device software stack, a translation from the virtual address offset to a physical address of the data of the access request stored on a non-volatile memory using the virtual address offset and the file object identifier; and
access the data from the physical address of the data of the access request stored on the non-volatile memory, wherein the data of the access request associated with the file system object is modified by the flash translation layer by writing to a log-structured file of a log-structured file system of the non-volatile memory, and the translation from the virtual address offset to the physical address for the data of the access request stored on the non-volatile memory is based at least in part on global wear leveling performed by the flash translation layer.

* * * * *